(12) United States Patent
Engstrom et al.

(10) Patent No.: US 9,596,310 B2
(45) Date of Patent: Mar. 14, 2017

(54) SYSTEM AND METHOD FOR REAL-TIME, PUSH STYLE, DISTRIBUTED DASHBOARD NETWORKS

(75) Inventors: Timo Esko Engstrom, Tallinn (EE); Jukka Petri Partanen, Espoo (FI); German Gluskov, Tallinn (EE)

(73) Assignee: ABILE MOBILE AS, Tallinn (EE)

( * ) Notice: Subject to any disclaimer, the term of this patent is extended or adjusted under 35 U.S.C. 154(b) by 661 days.

(21) Appl. No.: 13/636,064

(22) PCT Filed: Mar. 18, 2011

(86) PCT No.: PCT/IB2011/000583
§ 371 (c)(1),
(2), (4) Date: Sep. 19, 2012

(87) PCT Pub. No.: WO2011/114228
PCT Pub. Date: Sep. 22, 2011

(65) Prior Publication Data
US 2013/0013677 A1 Jan. 10, 2013

(30) Foreign Application Priority Data
Mar. 19, 2010 (EE) .................................. 201000030

(51) Int. Cl.
*G06F 15/16* (2006.01)
*G06F 9/44* (2006.01)
(Continued)

(52) U.S. Cl.
CPC .......... *H04L 67/2823* (2013.01); *H04L 67/12* (2013.01); *G06F 8/30* (2013.01); *H04L 67/26* (2013.01)

(58) Field of Classification Search
CPC ..... H04L 67/12; H04L 67/26; H04L 67/2823; G06F 8/30
(Continued)

(56) References Cited

U.S. PATENT DOCUMENTS

| 5,787,245 A | * | 7/1998 | You ..................... G06F 11/3664 |
| | | | 714/38.13 |
| 6,694,316 B1 | * | 2/2004 | Langseth ................ H04L 29/06 |

(Continued)

FOREIGN PATENT DOCUMENTS

| GB | 2455965 A | 7/2009 |
| WO | WO 2004061699 A1 | 7/2004 |
| WO | WO2005006711 | 1/2005 |

OTHER PUBLICATIONS

PCT International Search Report and Written Opinion; PCT/IB2011/000583; Nov. 18, 2011.

*Primary Examiner* — Arvin Eskandarnia
*Assistant Examiner* — Margishi Desai
(74) *Attorney, Agent, or Firm* — Berggren, Inc.

(57) ABSTRACT

A distributed dashboard system including related server side and communication related functionality is provided. The key is loosely defined metadata for input data coupled with the fact that metadata can be defined after the data is loaded to system. Only the part of metadata relevant to use of dashboard needs to be mapped. In current invention data can be loaded before "import file specification" is defined, and then meaning given in "point and click" fashion. Users can subscribe to different type of gauges (that make up the dashboard) to construct their own dashboard, mostly in a web based user interface, but also from the dashboard itself. In addition to gauges displaying information also input controls called levers are supported allowing users to input commands to the system that are processed by local device or server side system.

14 Claims, 3 Drawing Sheets

(51) Int. Cl.
  *G02B 27/14* (2006.01)
  *H04L 29/08* (2006.01)
(58) Field of Classification Search
  USPC .......................................... 709/203; 715/778
  See application file for complete search history.

(56) References Cited

U.S. PATENT DOCUMENTS

| | | | | |
|---|---|---|---|---|
| 7,133,805 B1* | 11/2006 | Dankenbring | ...... | G06F 11/3414 |
| | | | | 702/182 |
| 7,152,229 B2* | 12/2006 | Chong | ...... | G06F 8/10 |
| | | | | 717/131 |
| 8,006,200 B2* | 8/2011 | Griffith | ...... | G06Q 30/02 |
| | | | | 705/14.4 |
| 8,132,212 B2* | 3/2012 | Huegel | ...... | H04N 21/4722 |
| | | | | 725/136 |
| 8,429,630 B2* | 4/2013 | Nickolov | ...... | G06F 9/4856 |
| | | | | 717/110 |
| 8,683,501 B2* | 3/2014 | Huegel | ...... | G06Q 30/02 |
| | | | | 348/14.01 |
| 2005/0149345 A1 | 7/2005 | Daily | | |
| 2007/0174390 A1* | 7/2007 | Silvain | ...... | G06Q 10/10 |
| | | | | 709/204 |
| 2008/0229037 A1* | 9/2008 | Bunte | ...... | G06F 11/1451 |
| | | | | 711/162 |
| 2009/0119256 A1* | 5/2009 | Waters | ...... | H04L 41/5064 |
| 2009/0271324 A1* | 10/2009 | Jandhyala | ...... | G06Q 10/06375 |
| | | | | 705/80 |
| 2009/0327002 A1 | 12/2009 | Chapman et al. | | |
| 2010/0037163 A1* | 2/2010 | Griffith | ...... | G06Q 30/02 |
| | | | | 715/765 |
| 2010/0100424 A1* | 4/2010 | Buchanan | ...... | G06Q 20/10 |
| | | | | 705/35 |
| 2010/0293462 A1* | 11/2010 | Bull | ...... | G06F 9/4445 |
| | | | | 715/716 |
| 2010/0306034 A1* | 12/2010 | Stein | ...... | G06Q 30/02 |
| | | | | 705/14.46 |
| 2010/0324988 A1* | 12/2010 | Schaar | ...... | G06Q 30/02 |
| | | | | 705/14.42 |
| 2011/0246891 A1* | 10/2011 | Schubert | ...... | G06F 9/4445 |
| | | | | 715/719 |
| 2011/0265003 A1* | 10/2011 | Schubert | ...... | G06F 9/4445 |
| | | | | 715/716 |
| 2012/0246310 A1* | 9/2012 | Broda | ...... | G06F 11/3495 |
| | | | | 709/224 |
| 2012/0259773 A1* | 10/2012 | Hoffman | ...... | G06Q 40/00 |
| | | | | 705/40 |
| 2013/0030889 A1* | 1/2013 | Davich | ...... | G06Q 30/02 |
| | | | | 705/14.14 |
| 2013/0055145 A1* | 2/2013 | Antony | ...... | G05B 19/41875 |
| | | | | 715/781 |
| 2013/0226710 A1* | 8/2013 | Plut | ...... | G06Q 30/02 |
| | | | | 705/14.67 |
| 2013/0305269 A1* | 11/2013 | Verma | ...... | H04N 21/2543 |
| | | | | 725/5 |
| 2014/0075018 A1* | 3/2014 | Maycotte | ...... | H04L 67/22 |
| | | | | 709/224 |
| 2014/0142760 A1* | 5/2014 | Drees | ...... | G05B 15/02 |
| | | | | 700/275 |
| 2014/0146650 A1* | 5/2014 | Alber | ...... | G11B 27/002 |
| | | | | 369/53.41 |

* cited by examiner

SYSTEM AND METHOD FOR REAL-TIME, PUSH STYLE, DISTRIBUTED DASHBOARD NETWORKS

FIELD OF THE INVENTION

This invention relates to real-time data processing and reporting solution that utilizes both internet and cellular networks. Invention also relates to mobile device related software and to server side systems based on different operating systems.

PRIOR ART

Visual dashboards, various gauges and instrument panels, that typically display one or more numeric values in attractive graphical format are gaining popularity in connection with business intelligence systems.

The data in the typical dashboard is commonly retrieved from the corporate OLAP or OLTP (e.g. patent application WO 2005106711, filed 30 Apr. 2004) systems and setting up this kind of system requires often deep understanding of the OLAP or OLTP system in question and expert integration works to be carried out. Such a project work includes often tedious definition work of interface document structures and metadata definition work before the system can even be tested. Moreover, these systems are generally targeted on the analysis and aggregation of the existing structured data and are lacking capability to handle different independent data sources in a way where the user is able to describe the sources independently.

Commonly the dashboard on a stationary computer has a limited usefulness when used in conjunction with data that has a frequent refresh frequency, because of the inherent requirement of needing to have the stationary computer to be turned on and connected to internet.

Also none of the existing solutions seem to offer a simple, uniform and easy way to collect feedback from the dashboard viewers. It would be important for the dashboard systems to receive feedback about the instrument readings from users quickly and easily.

Closest solution from prior art can be regarded as solution described in the U.S. Pat. No. 6,694,316 (filed 21 Jan. 2000), where the system and method for subject-based channel distribution of automatic, real-time delivery of personalized informational and transactional data is given. According to the given patent application users subscribe to the system, which contains a number of databases with different information, select channels and services inside channels, and the system forwards the outcome to the email account, to a mobile phone, to a PDA, to a facsimile machine or alike. The terminal device is selected by the user. The system can also forward alert services, where the alert message is sent in the event of an alarm and pre-selected conditions are fulfilled. The main disadvantages of the described solution is the pre-defining the channels already in advance, also lack of encryption and data authenticity verification in the system.

Current solutions require a sizable upfront investment both in time and money, before deploying the system in full extent, and even then often the full usability is diminished by the omission of multi platform supporting the mobile dimension.

SUMMARY OF THE INVENTION

The aim of the invention is to provide a system and method for real-time, push style, distributed dashboard that is designed to display KPI based numeric information, deliver other types of information by the means of graphical user interface components, supporting feedback from users, where the dashboard system or instrument panel consists of output instruments called gauges and input instruments called levers, which allow users to both receive and send information through the server network that contains the intelligence to give meaning to data, also the rules and tasks to be carried out by the server infrastructure side are generated by the user terminal and delivered to server side through the ports.

Each user has access to one or more dashboards, that can be accessed either through a computer or a mobile device. A dashboard consists of gauges and levers. The software that forms the dashboard is a combination of devices native code and higher level programming environment for graphical interfaces, some native code is needed in order to implement data synchronization and buffering functionality efficiently. Supporting databases are used e.g. for storing customers' data and preferences.

Gauges, capable of providing visual or audiovisual content, are output devices that are constructed in various formats; one could be given an outlook of a thermometer, another like a speedometer. Each type of gauge has its own requirements for parameters, but they all implement the same documented and published interface. Gauges are implemented with high level programming environment, to ease portability of the dashboard over different mobile and computing platforms.

Levers are controls that are constructed in same way than gauges, the difference being that they can receive user input. A simple example of a lever is a switch, that user could set to "on" or "off" position, the position of the switch is sent to server every time it changes. Logic that is attached to that particular switch is defined on the server side.

A dashboard control can also be a hybrid of a gauge and a lever that displays output but also accepts input, e.g for sending feedback to the system. A dashboard system can also control dashboard displaying device to communicate with the external systems.

The server side functionality allows users to create and manage their own accounts, users can be simple data consumers and feedback providers at the same time or they can be content providers. Content providers can set up channels and allow certain users to access the content they have created.

Content can be gauges and levers linked to data they provide or it can even be entirely new gauges or levers created with high level programming language, according to system's specifications. Also an administrative interface is built into the system that allows system maintenance functionality.

Input data to a channel can come in one of the following manners:
file attached to an e-mail;
text within an e-mail;
application to application interface (for example Web Service interface);
File Upload from browser, or
text within SMS.

If data is of file type, the system can receive several supported file formats, however text forwarded by SMS or e-mail can be of comma delimited or fixed length format type. Output formats are only text with e-mail or SMS.

Additionally, the system also serves routed channels, meaning that the data from the input channel is routed as such to the output channel, then the output is the same as input. This functionality is useful when the input data is to be cleaned by the content provider before it is published.

The dashboard displaying devices are connected to the server infrastructure through ports in Proxy Server and Data Communication Server. Commands to be executed by the server infrastructure are generated in the user terminal.

Proxy Server handles the compressed communication between the dashboards, and is basically a routing and compression facility between the dashboards and servers.

The Data Communication Server is responsible of pushing and encrypting data as needed, to and from the proxy server.

According to the method of the current invention, when a user opens an account in the distributed dashboard system and wants to act as a data or content provider, then he or she creates a channel, if not existing before, receives an e-mail address for that particular channel, sends information to the distributed dashboard system about the format of the data (e.g. text, tabular information etc.) and sends the data file (or files) to that e-mail address given by the distributed dashboard system, after that the user gives meaning to data by defining metadata for the part that is necessary for the gauge that is to be defined soon. After the metadata is created, a gauge is chosen and the newly defined data items are linked to the gauge and the gauge is given a name and ID, after which the user will expose the gauge either as public or so that it is available to a certain group of users. The data at the output is affected by the rules given by metadata and the data filters that can be used in addition to metadata and input data while the data filters may access any other data they are programmed to access. Data converters and Data Export Server deploy rules given by the metadata or data filters. The rules are defined loosely in metadata. The tasks and rules for the server infrastructure are generated by the user terminal and sent to the server infrastructure through the ports.

The data filters are interchangeable. The data filters are located inside the Data Management and Storage Server.

The user can also give a price that an eventual subscriber is charged for the access to that gauge.

DETAILED DESCRIPTION OF THE PREFERRED EMBODIMENTS

Figure 1:
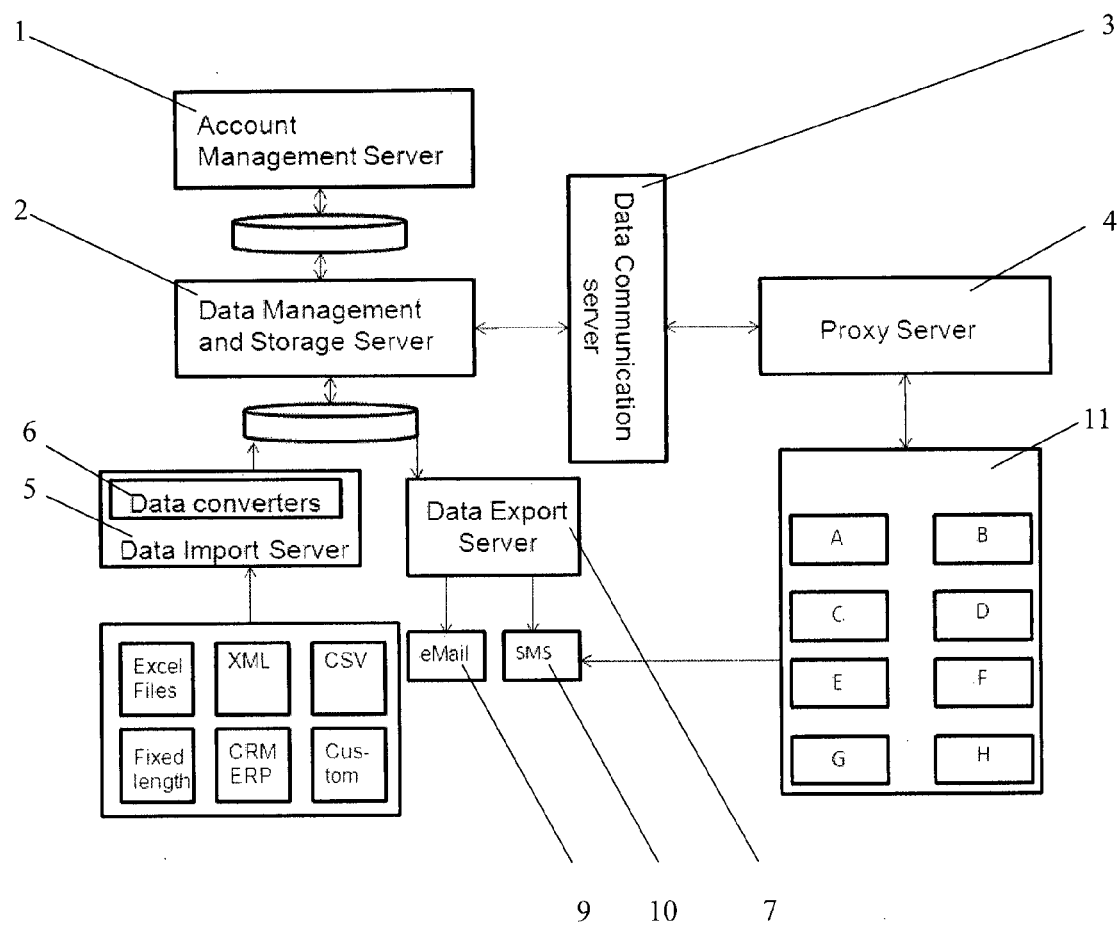
FIG. 1 shows an overall logical structure of the invention.
Figure 2:
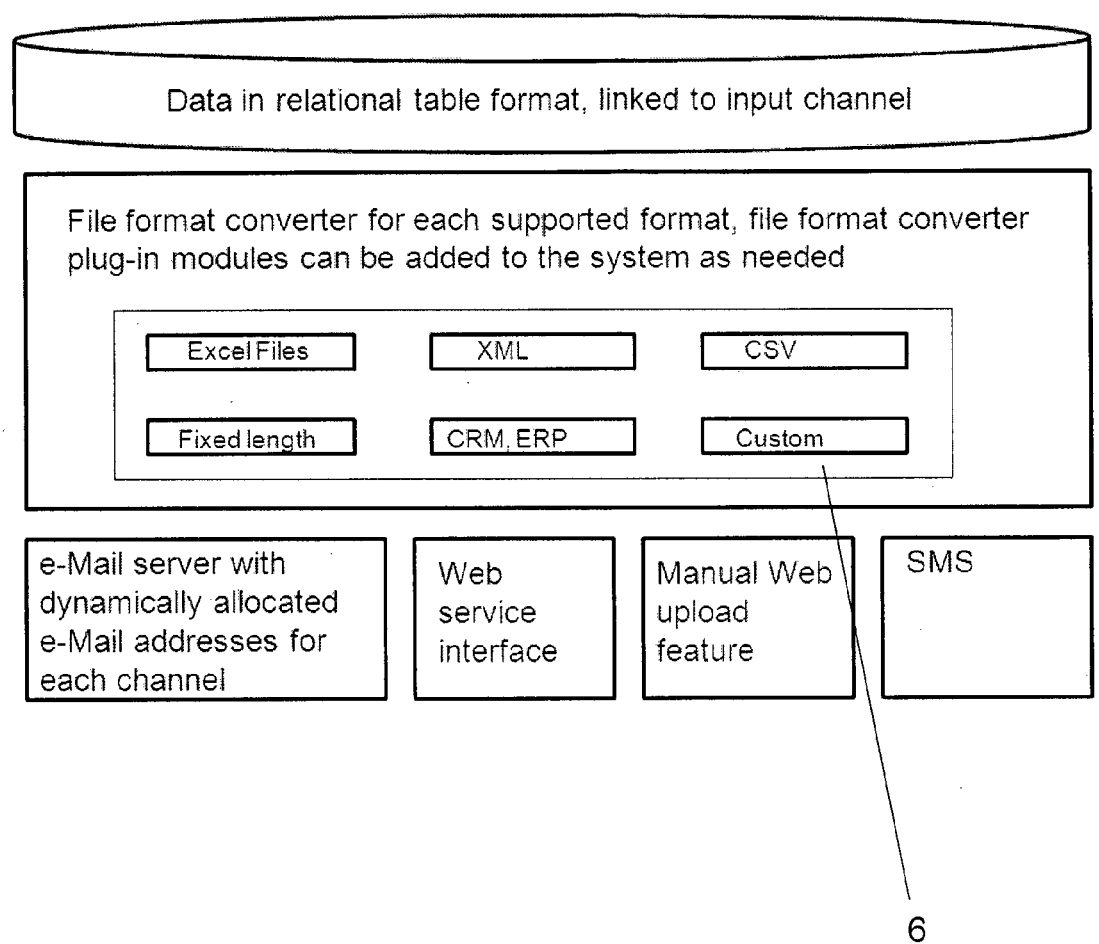
FIG. 2 shows general structure of the data import server.
Figure 3:
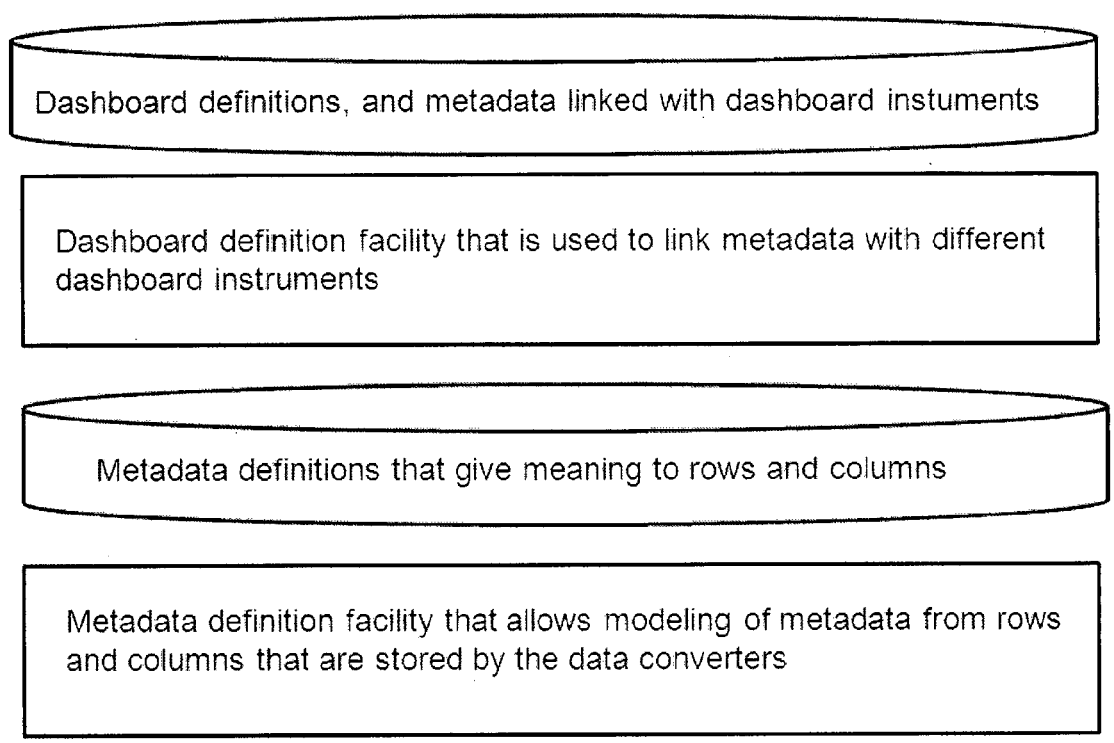
FIG. 3 shows the general structure of data management and storage server.

Below the detailed description of the preferred embodiments is given, where references to FIGS. 1-3 are done.

In a preferred embodiment each user has access to one or more dashboard system, that can be accessed either through a computer or a mobile device.

A distributed dashboard system consists of gauges and levers. The software that forms the dashboard is a combination of device native code and higher level programming environment for graphical interfaces, such as Adobe Flash.

Gauges are constructed in various formats—for example one is given an outlook of a thermometer, and the other a speedometer. Gauges are implemented with high level programming environment such as Adobe Flash.

Levers are constructed in same way than gauges, the difference being that they can receive user input.

A dashboard control can be a hybrid of a gauge and a lever that displays output but also accepts input, e.g. for sending feedback to the distributed dashboard system. The tasks and rules for the server infrastructure are generated by the user terminal and sent to the server infrastructure through the ports.

The server side of the distributed dashboard system constitutes an Account Management Server 1, Data Management and Storage Server 2, Data Communication Server 3, Proxy Server 4, Data Import Server 5 with Data Converters 6 and Data Export Server 7, which are interconnected with each other, and data filters inside the Data Management and Storage Server 2.

The server side functionality is adjusted to allow users to create and manage their own accounts, while users can be simple data consumers and feedback providers at the same time or they can be content providers or both feedback and content providers. Content can be gauges and levers linked to data they provide or it can even be entirely new gauges or levers created with high level programming language, such as Adobe Flash. Also an administrative interface 8 is built into the distributed dashboard system that allows distributed dashboard system maintenance functionality.

In a preferred embodiment the distributed dashboard system is configured to accept input data to a channel by the following manners (see also FIG. 1):
file attached to an e-mail;
text within an e-mail;
application to application interface (for example a Web Service interface);
File Upload from browser, or
text within SMS.

If data is of file type, the distributed dashboard system can receive several supported file formats (see also FIG. 2), however text forwarded by SMS or e-mail needs to be of comma delimited or fixed length format type. Output formats are text with e-mail 9 or SMS 10. In the current preferred embodiment the following Data Converters 6 are implemented in the distributed dashboard system: excel, XML, CSV, fixed length, CRM ERP, and a few customised format converters.

Data at the output is affected by the rules given by metadata and the data filters that can be used in addition to metadata and input data while the data filters may access any other data they are programmed to access. Data converters 6 and Data Export Server 7 deploy rules given by the metadata or data filters, while data filters are interchangeable. The rules are defined loosely in metadata. The tasks and rules for the server infrastructure are generated by the user terminal and sent to the server infrastructure through the ports.

Additionally, the distributed dashboard system is adjusted to provide also routed channels.

The dashboard displaying devices 11 are connected to the server infrastructure through Proxy Server 4 and Data Communication Server 3.

Proxy Server 4 handles the compressed communication between the dashboards, and is basically a routing and compression facility between the dashboards and servers, providing also redundancy scalability and availability.

The Data Communication Server 3 is responsible of pushing and encrypting data as needed, to and from the Proxy Server 4. The system also allows the user to assign a price that an eventual subscriber is charged for the access to that gauge.

According to the method of the current invention, when a user opens an account in the distributed dashboard system and wants to act as a data or content provider, then he or she creates a channel, if not existing before, receives an e-mail address for that particular channel, sends information to the distributed dashboard system about the format of the data (e.g. text, tabular information etc.) and sends the data file (or files) to that e-mail address given by the distributed dashboard system, after that the user gives meaning to data by defining metadata for the part that is necessary for the gauge that is to be defined soon. After the metadata is created, a gauge is chosen and the newly defined data items are linked to the gauge and the gauge is given a name and ID, after which the user will expose the gauge either as public or so that it is available to a certain group of users.

The dashboard displaying devices are adjusted to communicate also with external systems according to the information from dashboard system. The tasks and rules for the server infrastructure are generated by the user terminal and sent to the server infrastructure through the ports.

The user can also give a price that an eventual subscriber is charged for the access to that gauge.

The invention claimed is:

1. A system for real-time, push style, distributed dashboard networks system-comprising:
   an Account Management Server,
   a Data Management and Storage Server,
   a Data Communication Server,
   a Proxy Server,
   a Data Import Server,
   Data Converters,
   a Data Export Server,
   one or more data filters inside the Data Management and Storage Server, and
   a dashboard displaying devices where the dashboard comprises visual gauges and levers, and wherein:
   the Account Management Server comprises management facilities for Users, Channels, Subscriptions, and Billing Information;
   the Data Management and Storage Server comprises one or more output translators for converting feedback to meaningful responses, metadata definition facility for loosely defining metadata from bare data, loosely defined meaning that only the data items (Key Performance Indicators, KPI's; that are meaningful for particular channel are included in the metadata definition, metadata that includes rules for finding KPI's from bare data, and logical preprocess conversion service for incoming data;
   the Data Communication Server comprises logic for linking users to output data and lever feedback, data encryption and decryption service, and service to duplicate the output data for different subscriptions;
   the Proxy Server comprises data compression service, and communication logic between the gauge and server side;
   the Data Import Server comprises data converters for various data formats and services for receiving data using different types of input ports such as e-mails, SMS (short message service), application to application and file transfer;
   the Data converters comprise converters that convert the incoming data into internal XML (extensible markup language) representation for the data;
   the Data Export Server comprises service to send the lever response using SMS, email, web service or other suitable method required by the target system;
   the dashboard that comprises visual gauges and levers within dashboard displaying devices comprises a single app that can host the gauges and/or levers or a single app that comprises the dashboard and single gauge/lever functionality; and
   the system has facility to allow the creation of the metadata from the input bare data itself after instance(s) of the input bare data already exists in the system; having a capability to convert feedback to SMS, email or other system-to-system message sent by server side logic; wherein the system is adapted to carry out the steps of:
   a) a user creating a new account in the distributed dashboard system for the user to input bare data and provide content to the system;
   b) the user creating a channel and defining format for this channel in the distributed dashboard system;
   c) the user receiving an email-address from the distributed dashboard system to be used for the user to input bare data to the system;
   d) the distributed dashboard system receiving the bare data provided by the user by means of the e-mail address given by the distributed dashboard system;
   e) the distributed dashboard system informing the user that the bare data has been received by the distributed dashboard system and metadata should be defined;
   f) the user creating metadata for the distributed dashboard system that gives meaning to only those parts of the bare data that are relevant for gauges to be chosen in step q);
   g) the user choosing gauge(s) and/or lever(s) and linking data items defined in step e) by the metadata giving meaning to relevant bare data to the gauges) and/or lever(s) and they form a visual dashboard item;
   h) (living a name and an identification to the dashboard item, allowing one or more dashboard items to be defined per channel;
   i) the user exposing the channel either as a public channel, a shared channel, or a private channel;
   j) the distributed dashboard system activating the channel; and
   k) generating data at output.

2. The system according to claim 1, wherein the Account Management Server, the Data Communication Server with the Proxy Server, the Data Import Server with the Data converters, and the Data Export Server are connected with the Data Management and the Storage Server, while one or more data filters are located inside the Data Management and Storage Server and the dashboard displaying devices and the meaning of the data being loosely defined inside the system after the bare data has been inserted to the system;
   the bare data is inserted to the system by at least five alternative means including file attached to an e-mail, text within an email, through an application to application interface, file upload from browser and text within SMS;
   two or more means including email and SMS are used for exporting the data from the system; the communication between system's servers and the dashboard displaying devices is encrypted;
   the output is adapted to generate data based on the bare data, metadata, information, feedback, trigger, output rule and output translator while the rules given by metadata and the data filters that can be used in addition to metadata and input data while the data filters may access any other bare data they are programmed to access;
   the Data Converters and the Data Export Server are adjusted to deploy rules given by the metadata or data filters, where the data filters are interchangeable;
   the rules are defined loosely in the metadata; the dashboard displaying devices are adjusted to communicate with an external system according to the information from the dashboard system; the tasks and rules for the server infrastructure are generated by the user terminal and sent to the server infrastructure through the ports.

3. The system according to claim 2, wherein the Data Converters inside the Data Import Server are applied by for numerous formats.

4. The system according to claim 1, wherein the Data Converters inside the Data Import Server are applied by for numerous formats.

5. The system according to claim 4, wherein the Data Converters are deployed for Excel, XML, CSV, Fixed length, CRM ERP, and customized data formats.

6. The system according to claim 1, wherein the Data Converters are deployed for Excel, XML (extended markup language), CSV (comma separated values, Fixed length, CRM ERP (customer relationship management, enterprise resource planning), and customized data formats.

7. The system according to claim 6, wherein the gauges and the levers are formed by high level programming environment as graphical user interfaces, and gauges only receive information from the system, and the levers can receive and return information from and to the system.

8. The system according to claim 1, wherein gauges and levers are formed by high level programming environment as graphical user interfaces, and the gauges only receive information from the system, and the levers can receive and return information from and to the system.

9. The system according to claim 8, wherein the system has two types of users active in the system, the types being: consumers with an ability to give feedback, and content providers, and wherein the feedback can be deployed as control information in the system or as data input to the system.

10. The system according to claim 1, wherein the system has two types of users active in the system, the types being: consumers with an ability to give feedback, and content providers, and wherein the feedback can be deployed as control information in the system or as data input to the system.

11. The system according to claim 10, wherein the dashboard displaying devices are connected to the server infrastructure through the Proxy Server and the Data Communication Server.

12. The system according to claim 1, wherein the dashboard displaying devices are connected to the server infrastructure through the Proxy Server and the Data Communication Server.

13. The system according to claim 12, wherein the servers of the system push data into the dashboard displaying devices.

14. The system according to claim 1, wherein the servers of the system push data into dashboard displaying devices.

* * * * *